United States Patent
Yasuhara

(10) Patent No.: US 9,246,896 B2
(45) Date of Patent: Jan. 26, 2016

(54) REGISTRATION OF A SECURITY TOKEN

(71) Applicant: Canon Information and Imaging Solutions, Inc., Melville, NY (US)

(72) Inventor: Hiroshi Yasuhara, Roslyn Heights, NY (US)

(73) Assignee: Canon Information and Imaging Solutions, Inc., Melville, NY (US)

( * ) Notice: Subject to any disclaimer, the term of this patent is extended or adjusted under 35 U.S.C. 154(b) by 50 days.

(21) Appl. No.: 13/844,279

(22) Filed: Mar. 15, 2013

(65) Prior Publication Data

US 2014/0282941 A1    Sep. 18, 2014

(51) Int. Cl.
*H04L 29/06* (2006.01)

(52) U.S. Cl.
CPC .................................. *H04L 63/08* (2013.01)

(58) Field of Classification Search
CPC .................................................... H04L 63/10
USPC ............................................................ 726/6, 9
See application file for complete search history.

(56) References Cited

U.S. PATENT DOCUMENTS

| | | | |
|---|---|---|---|
| 6,374,356 B1 | 4/2002 | Daigneault et al. | |
| 6,834,795 B1 | 12/2004 | Rasmussen et al. | |
| 7,571,489 B2 | 8/2009 | Ong et al. | |
| 7,788,712 B2 | 8/2010 | Hong et al. | |
| 8,031,051 B2 * | 10/2011 | Tsukamoto | 340/10.1 |
| 8,059,570 B2 | 11/2011 | Albert et al. | |
| 8,144,941 B2 | 3/2012 | Adams et al. | |
| 8,204,513 B2 | 6/2012 | Crowley et al. | |
| 8,319,606 B2 | 11/2012 | McGeachie | |
| 2002/0099831 A1 * | 7/2002 | Tsunogai | 709/227 |
| 2006/0005237 A1 * | 1/2006 | Kobata et al. | 726/12 |
| 2006/0036547 A1 * | 2/2006 | Yasuhara | 705/44 |
| 2007/0067627 A1 * | 3/2007 | Dokuni | 713/168 |
| 2007/0239625 A1 * | 10/2007 | Sterns et al. | 705/400 |
| 2008/0114987 A1 * | 5/2008 | Morris et al. | 713/183 |
| 2010/0058064 A1 * | 3/2010 | Kirovski et al. | 713/176 |
| 2010/0115268 A1 * | 5/2010 | Kudo | 713/156 |

(Continued)

OTHER PUBLICATIONS

Hadjioannou, "A secure Dynamic Data Aggregation Systems for Citizen Safety in Emergency Response Scenarios", 2012, IEEE, p. 689-696.*

(Continued)

*Primary Examiner* — Jason Lee
*Assistant Examiner* — Gregory Lane
(74) *Attorney, Agent, or Firm* — Canon U.S.A., Inc. IP Division

(57) ABSTRACT

Methods, systems, and computer-readable media are provided. In some embodiments, a first computing system receives a credential from a browser on a second computing system, determines whether the credential is valid, generates a string of numeric characters, associates the string of numeric characters with the credential, and sends the string of numeric characters to the second computing system. Furthermore, in some embodiments, the first computing system receives an identifier that identifies a security token, determines whether the identifier matches an entry in a data store, prompts a user to input information via a user interface, receives a string of characters via the user interface, determines whether the string of characters received via the user interface matches the string of numeric characters, and performs a registration process such that the identifier is associated with a user account in the data store, the user account associated with the credential.

19 Claims, 4 Drawing Sheets

(56) References Cited

U.S. PATENT DOCUMENTS

| | | | |
|---|---|---|---|
| 2011/0252145 A1* | 10/2011 | Lampell et al. | 709/227 |
| 2011/0265159 A1* | 10/2011 | Ronda et al. | 726/6 |
| 2011/0307949 A1* | 12/2011 | Ronda et al. | 726/9 |
| 2012/0154117 A1 | 6/2012 | Nice et al. | |
| 2013/0041831 A1* | 2/2013 | Das | 705/72 |

OTHER PUBLICATIONS

Novell, NordicEdge Strong authentication through one time password for Novell Access Manager 3, Mar. 27, 2007 (http://www.novell.com/coolsolutions/tools/19011.html), pp. 1-2.

Equitrac, Equitrac Print & Copy Control Setup Guide, Jun. 7, 2010, pp. 1-70.

Xerox, Xerox Secure Access Unified ID System, 2010, pp. 1-50.

\* cited by examiner

REGISTRATION OF A SECURITY TOKEN

BACKGROUND OF THE INVENTION

1. Field of the Invention

The present invention relates generally to identity management, and more particularly to a system and method for managing information associated with a user and controlling access to a resource.

2. Description of the Related Art

Modern computing systems often employ security measures to control access to protected resources. For example, a computing system may implement authentication and authorization processes in order to prevent unauthorized entities from accessing a protected resource. Authentication may include the computing system prompting an entity to provide a credential in order to verify the entity's identity. The authentication may be based on a username and password, a smart card and personal identification number (PIN), or other information associated with the entity. Authorization may include the computing system checking attribute information of the entity in order to verify that the entity is authorized to access the requested resource. For example, the computing system may grant or deny access to a resource based on whether the attribute information of the requesting entity satisfies predefined criteria.

A management system may be employed to manage information, such as user accounts and their associated attributes, and security processes, such as authentication and authorization processes. The computing system or application that provides the protected resource may include such a management system. That is, the computing system or application may manage the information and security processes locally using its own management system dedicated to one or more resources the computing system provides. Alternatively or additionally, the computing system or application that provides the protected resource may use a centralized management system.

A centralized management system may provide, among other things, information management and authentication services for various entities on a network. For example, the centralized management system may manage user accounts for network participants as well as accounts for network resources. When a user tries to access a network resource, the centralized management system, using the account information, may authenticate the user and determine whether the user is authorized to access the resource. Then, only authenticated users who are authorized to access the protected resource may be granted access.

User accounts may be added or deleted, and account attributes may be modified. If a security token, such as a smart card, is to be used for user authentication, the security token must be registered to associate the user account with the security token. Once registered, the security token may be used to gain access to a protected resource on the network.

BRIEF SUMMARY OF THE INVENTION

Methods, systems, and computer-readable media for registration of a security token are disclosed.

Some embodiments of the invention include receiving, at a first computing system from a browser on a second computing system, a credential. The first computing system determines whether the credential is valid. In response to determining that the credential is valid, the first computing system generates a string of numeric characters and associates the string of numeric characters with the credential. The first computing system sends the string of numeric characters to the second computing system. Furthermore, the first computing system receives an identifier that identifies a security token, the security token comprising a machine-readable storage medium that stores the identifier. The first computing system determines whether the identifier matches an entry in a data store. In response to determining that the identifier does not match an entry in the data store, the first computing system prompts a user to input information via a user interface of the first computing system. The first computing system receives a string of characters via the user interface and determines whether the string of characters received via the user interface matches the string of numeric characters. In response to determining that the string of characters received via the user interface matches the string of numeric characters, the first computing system performs a registration process such that the identifier is associated with a user account in the data store, the user account associated with the credential.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

Figure 1:
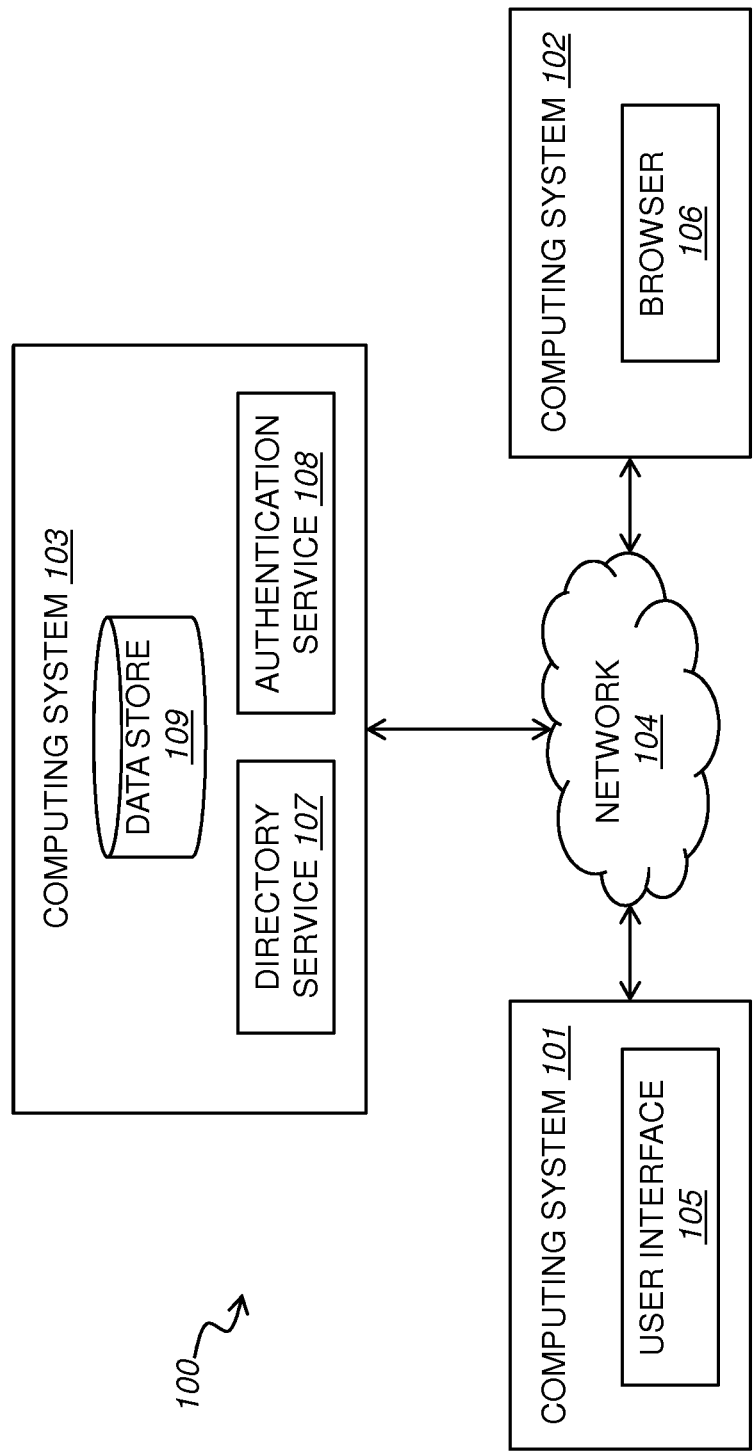
FIG. 1 illustrates an example network environment.

Embodiments of the present invention are described with reference to the drawings. FIG. 1 illustrates an example network environment 100. A computing system 101 having an user interface 105, a computing system 102 having a browser 106, and a computing system 103 having a directory service 107, an authentication service 108, and a data store 109 are connected to a network 104.

The computing system 101 includes hardware, software, or both for providing the functionality of the computing system 101. The computing system 101 may include one or more servers. For example, the computing system 101 may include one or more web servers, application(s) servers, fax servers, file servers, mail servers, or print servers. In some embodiments, the computing system 101 is unitary. In some embodiments, the computing system 101 is distributed. The computing system 101 may span multiple locations. The computing system 101 may span multiple machines.

In some embodiments, the computing system 101 performs one or more steps of one or more methods described or illustrated herein. In some embodiments, the computing system 101 provides functionality described or illustrated herein. In some embodiments, software running on the computing system 101 performs one or more steps of one or more methods described or illustrated herein or provides functionality described or illustrated herein. Particular embodiments include one or more portions of the computing system 101. By way of example and not by way of limitation, one or more programs on the computing system 101 may include instructions that, when executed by one or more processors, cause the one or more processors to perform one or more operations described with respect to FIG. 2.

In some embodiments, the computing system 101 provides web server functionality. The computing system 101 may have stored thereon one or more programs for receiving hypertext transfer protocol (HTTP) requests and providing HTTP responses. For example, the computing system 101 may serve content in the form of a web page in response to a request from a web browser. The web page may be static or dynamic and may comprise Hyper Text Markup Language (HTML) files, or other suitable files, executable programs, form elements, images, or other content. One or more elements of the web page content may be stored at the computing system 101.

The computing system 101 includes the user interface 105. The user interface 105 includes hardware, software, or both for providing the functionality of the user interface 105. The user interface 105 may include an operation panel. The user interface 105 may output signals and receive input signals via the operation panel so as to facilitate interaction between a user and the computing system 101. An operation panel may include a hard key panel and/or a touch sensitive display. A user may provide user input operations via the hard key panel and/or the touch sensitive display to control the computing system 101 via the operation panel. For example, the user may press one or more hard buttons to issue one or more commands. Further by way of example, a user may provide a touch input to an interface element displayed on the display to issue a command and/or to make a selection. Moreover, the computing system 101 may output information to the user and issue requests by outputting images on a display.

In some embodiments, the user interface 105 includes one or more controls for scrolling between characters and selecting characters. For example, the one or more controls may include one or more hard buttons or one or more interface elements in a graphical user interface on a display of the computing system 101.

The computing system 102 includes hardware, software, or both for providing the functionality of the computing system 102. In some embodiments, the computing system 102 is unitary. In some embodiments, the computing system 102 is distributed. The computing system 102 may span multiple locations. The computing system 102 may span multiple machines. The browser 106 may execute on the computing system 102.

The browser 106 may be a web browser such as MICROSOFT INTERNET EXPLORER or MOZILLA FIREFOX, and may be used to access a resource, such as a web page. The browser 106 may enable a user to display and interact with text, images, form elements, or other information typically located on a web page served by a web server on the World Wide Web or a local area network. The browser 106 may support various types of downloadable, executable, software modules, such as applets or plug-ins. For example, the browser 106 may incorporate a virtual machine configured to execute a program, such as a JAVA applet, embedded in a web page accessed by the browser 106. The computing system 102 may have various add-ons, plug-ins, or other extensions for use in or with the browser 106.

The computing system 103 includes hardware, software, or both for providing the functionality of the computing system 103. The computing system 103 may include one or more servers. For example, the computing system 103 may include one or more application(s) servers, name servers, file servers, database servers, mail servers, or web servers. In some embodiments, the computing system 103 is unitary. In some embodiments, the computing system 103 is distributed. The computing system 103 may span multiple locations. The computing system 103 may span multiple machines.

The computing system 103 may provide network services for entities within the network 104. In some embodiments, the computing system 103 provides centralized management of account information and security processes for entities within the network 104. Examples of network services the computing system 103 may provide include directory services, authentication services, naming services, and secure access to resources on the network 104. The computing system 103 may provide one or more network services for network entities, such as the computing system 101, the computing system 102, or users within the network 104.

The computing system 103 includes the directory service 107, the authentication service 108, and the data store 109. These components of the computing system 103 reside in the computing system 103 in any suitable manner. For example, these components may reside on one or multiple servers. In some embodiments, one or more of these components may be provided as part(s) of a software application. In some embodiments, one or more of these components may be provided as a stand-alone software application.

The directory service 107 may be used for maintaining and accessing information stored in the data store 109. In some embodiments, the directory service 107 uses Lightweight Directory Access Protocol (LDAP) to interact with information in the data store 109. The directory service 107 may perform various operations with respect to the data store 109. Examples of operations include adding entries to the data store 109; deleting entries from the data store 109; modifying entries in the data store 109; searching for entries in the data store 109; and retrieving entries from the data store 109.

In some embodiments, information stored in the data store 109 is organized into a hierarchy of objects. Each object may represent an entity within the network 104. By way of example, entities within the network 104 may be users, computing devices, applications, services, groups, or other suitable entities. In some embodiments, each object has a unique identifier and contains a set of attributes. Attributes for a user account, for example, may include the user's password or other credential, or group membership information indicating a group to which the user belongs, such as an administrator group. Objects may be grouped in any suitable manner, such as into domains or further into units within a domain; and may be grouped for any suitable reason, such as for ease of administration in applying group policies, or to correspond to an organization's structure.

The authentication service 108 may be used to authenticate network entities seeking access to resources on the network 104. In some embodiments, the authentication service 108 uses the Kerberos protocol to authenticate network entities. The authentication service 108 may comprise a key distribution center (KDC). In response to a service request, the authentication service 108 may access account information of the entity that sent the service request. In some embodiments, the account information comprises an object and its attributes stored in the data store 109.

In some embodiments, an LDAP-compliant directory service is running on the computing system 103. In some embodiments, ACTIVE DIRECTORY is running on the computing system 103. In some embodiments, the computing system 101, the computing system 102, and the computing system 103 belong to the same domain and access to resources within the domain is controlled by the computing system 103.

The network 104 couples one or more servers and one or more clients to each other. The network 104 may be any suitable network. For example, one or more portions of the network 104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 104 may include one or more networks.

Figure 2:
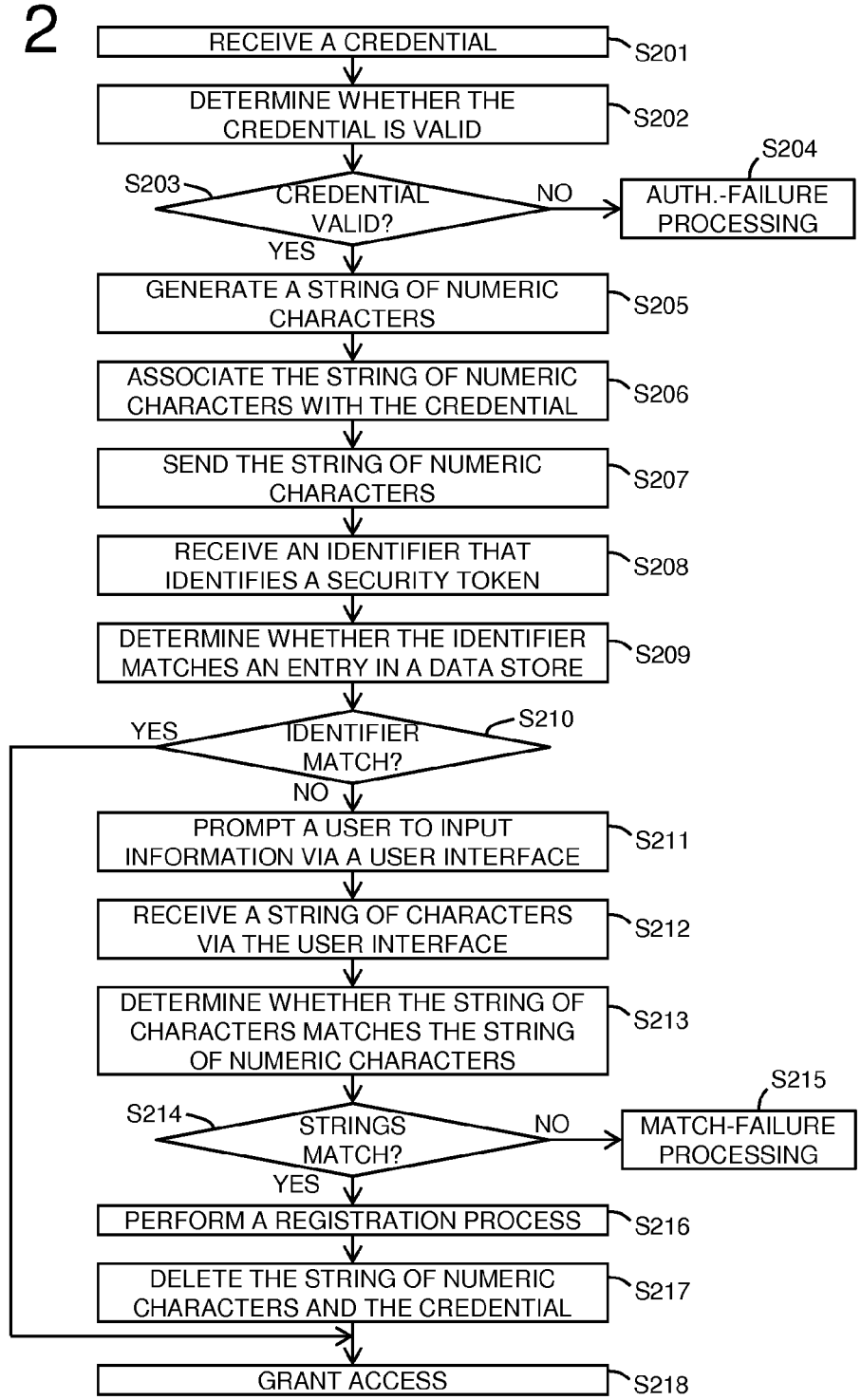
FIG. 2 illustrates an example flow of operations at a computing system.

FIG. 2 is described with reference to the example network environment 100 of FIG. 1. FIG. 2 illustrates an example flow of operations at the computing system 101.

In step S201, the computing system 101 receives from the browser 106 on the computing system 102 a credential. For example, the computing system 101 may host a web page that includes form elements for inputting a credential such as a user name and password. In some embodiments, the computing system 101 receives from the browser 106 on the computing system 102 a request to access the web page. In response to the request, the computing system 101 may send to the computing system 102 the web page. Then, the computing system 102 may receive the credential. For example, a user may provide the credential via an input/output (I/O) interface of the computing system 102. The credential may be a username and password. The credential may be submitted by the user via the browser 106 and the browser 106 may then send the credential to the computing system 101.

In step S202, the computing system 101 determines whether the credential is valid. In some embodiments, the computing system 101 uses a remote authentication service to determine whether the credential is valid. For example, the computing system 101 may send the credential to the authentication service 108 with a request to authenticate the user. In some embodiments, the authentication service 108 uses the Kerberos protocol to authenticate the user. In response to the service request, the authentication service 108 may access account information of the user. In some embodiments, the account information comprises an object and its attributes stored in the data store 109. The authentication service 108 may use the provided username and password and the data stored in the data store 109 to authenticate the user. The authentication service 108 then sends an authentication response to the computing system 101 indicating whether the authentication was successful or whether the authentication failed. If the authentication was successful, the computing system 101 determines that the credential is valid. On the other hand, if the authentication failed, the computing system 101 determines that the credential is not valid.

In some embodiments, step S202 includes the computing system 101 determining whether the credential is valid by comparing the credential to user information on an access control list stored locally. Based on the comparison, the computing system 101 may determine, for example, the credential is valid in a case the credential matches some user information on the access control list, or the credential is not valid in a case the credential does not match some user information on the access control list.

In step S203, in response to the computing system 101 determining that the credential is not valid (no in step S203), the process continues to step S204. In step S204, the computing system 101 performs processing in response to the authentication failure. For example, the computing system 101 may prepare and cause to be displayed information indicating to the user that authentication has failed or that the user is denied access to one or more resources of the computing system 101. The displayed information may include a request that the user provide a credential again, for example. On the other hand, in response to the computing system 101 determining that the credential is valid (yes in step S203), the process continues to step S205.

In step S205, the computing system 101 generates a string of numeric characters. In some embodiments, the string of numeric characters is generated using an algorithm. In some embodiments, the string of numeric characters comprises random or pseudo-random data.

In step S206, the computing system 101 associates the string of numeric characters with the credential. In some embodiments, the computing system 101 associates the string of numeric characters with the credential by storing the string of numeric characters and the credential in a memory of the computing system 101. By way of example, the computing system 101 may store the string of numeric characters and the credential in random access memory (RAM) of the computing system 101 such that the two values are associated with each other. In some embodiments, the string of numeric characters and the credential are stored in a cache memory together.

In step S207, the computing system 101 sends the string of numeric characters to the computing system 102. For example, the computing system 101 may send the string of numeric characters as text in a web page to be displayed by the browser 106.

In some embodiments, in response to an event associated with the string of numeric characters, the computing system 101 initiates a timer that expires after a predetermined time period. By way of example, the event associated with the string of numeric characters which initiates the timer may be the generation of the string of numeric characters in step S205, the associating the string of numeric characters with the credential in step S206, or the sending of the string of numeric characters in step S207. The computing system 101 may monitor for an expiration of the timer. Additionally, based on the expiration of the timer, the computing system 101 may delete the string of numeric characters and the credential from a memory of the computing system 101.

In step S208, the computing system 101 receives an identifier that identifies a security token. The security token may be a machine-readable storage medium that stores the identifier. By way of example, the security token may be a smart card (for example, a proximity card), a mobile device, or other security token. The identifier may be a string of characters (for example, numbers, letters, symbols, or a combination of these) that identifies the security token.

In some embodiments, the computing system 101 receives the identifier via an input device that reads the identifier from the security token. For example, the input device may be a smart card reader, radio-frequency identification (RFID) reader, a near field communication (NFC) interface (for example, an NFC reader), or other suitable device; and the computing system 101 may receive the identifier via the smart card reader, RFID reader, NFC reader, or other suitable device. In some embodiments, the computing system 101 includes the input device. In some embodiments, the computing system 101 includes one or more input/output (I/O) port(s) and the input device is an external device connected to an I/O port of the computing system 101. A user may present a security token to the input device in order to log on to the computing system 101 or to access a resource provided by the computing system 101.

In step S209, the computing system 101 determines whether the identifier matches an entry in a data store. In some embodiments, the computing system 101 determines whether the identifier matches an entry in the data store 109. For example, the computing system 101 may use the directory service 107 to determine whether an entry in the data store 109 matches the identifier received in step S208. The computing system 101 may request the directory service 107 to perform a search operation using the LDAP protocol to search the data store 109 for an entry that matches the identifier. The directory service 107 may search the data store 109 and compare the identifier to entries in the data store 109. The computing system 101 may then receive from the directory service 107 a result of the search performed by the directory service 107. For example, the computing system 101 may receive an indication that an entry in the data store 109 matched the identifier or an indication that no entry in the data store 109 matched the identifier.

In some embodiments, step S209 includes the computing system 101 determining whether the identifier matches an entry in a data store by comparing the identifier to information stored locally. For example, the computing system 101 may search a local data store and compare the identifier received in step S208 to entries in the local data store. In some embodiments, the local data store includes one or more user accounts. A user account may include the following entries: a username; a domain identifier such as a domain name; and an identifier that identifies a security token, such as a smart card identification number. In some embodiments, the computing system 101 searches the local data store and compares the identifier received in step S208 to user account data.

In step S210, in response to the computing system 101 determining that the identifier matches an entry in the data store (yes in step S210), the process continues to step S218. On the other hand, in response to the computing system 101 determining that the identifier does not match an entry in the data store (no in step S210), the process continues to step S211.

In step S211, the computing system 101 prompts a user to input information via the user interface 105 of the computing system 101. For example, the computing system 101 may present a message to the user on a display of the computing system 101 requesting the user to input a string of characters.

In step S212, the computing system 101 receives a string of characters via the user interface 105. The string of characters received via the user interface 105 may be a string of characters generated based at least in part on user interactions with the one or more controls of the user interface 105. For example, a user may scroll between characters and select characters using the one or more controls of the user interface 105. The one or more controls may include one or more hard buttons, one or more interface elements in a graphical user interface on a display of the computing system 101, or some other input device. In some embodiments, the user inputs a string of characters using a number key pad on an operation panel of the computing system 101.

In step S213, the computing system 101 determines whether the string of characters received via the user interface 105 in step S212 matches the string of numeric characters generated in step S205. For example, the computing system 101 may compare the string of characters received via the user interface 105 to the string of numeric characters generated in step S205 which is stored in a memory of the computing system 101.

In step S214, in response to the computing system 101 determining that the string of characters received via the user interface 105 in step S212 does not match the string of numeric characters generated in step S205 (no in step S214), the process continues to step S215. On the other hand, in response to the computing system 101 determining that the string of characters received via the user interface 105 in step S212 matches the string of numeric characters generated in step S205 (yes in step S214), the process continues to step S216.

In step S215, the computing system 101 performs processing in response to the failure to match the user-provided information with the string of numeric characters. For example, the computing system 101 may prepare and cause to be displayed information indicating to the user that user-provided information is unrecognized by the computing system 101 or that the user is denied access to one or more resources of the computing system 101. The displayed information may include a request that the user provide information again via the user interface 105 of the computing system 101. For example, the computing system 101 may request information different from the string of characters input by the user in step S212. If the user does provide another string of characters via the user interface 105, the computing system 101 repeats step S213. If the computing system determines again that the string of characters received via the user interface 105 does not match the string of numeric characters generated in step S205, the computing system 101 may delete the string of numeric characters and the credential from a memory of the computing system 101. Additionally, the computing system 101 may present information indicating the user is denied access to one or more resources of the computing system 101.

In some embodiments, the computing system 101 may have deleted the string of numeric characters received in step S205 in response to the expiration of a timer. Accordingly, even if a user inputs a character string that matches a numeric character string received in step S205, if the numeric character sting was previously deleted from the memory of the computing system, then the computing system 101 will fail to match character strings in step S214.

In step S216, the computing system performs a registration process such that the identifier is associated with a user account in a data store, the user account associated with the credential. For example, the computing system 101 may register the identifier in the data store 109. For example, the computing system 101 may send a request to the directory service 107 to perform an operation to add an entry to the data store 109. The computing system 101 may request the directory service 107 to add the identifier to a user's account in the data store 109, namely, the user account associated with the credential received in step S201 which was associated with the string of numeric characters in step S206. After the identifier is registered, the process continues to step S217.

In step S217, the computing system 101 deletes the string of numeric characters and the credential from the memory after the performing the registration process.

In step S218, the user is logged on to the computing system 101 and/or the user is granted access to a resource provided by the computing system 101.

Figure 3:
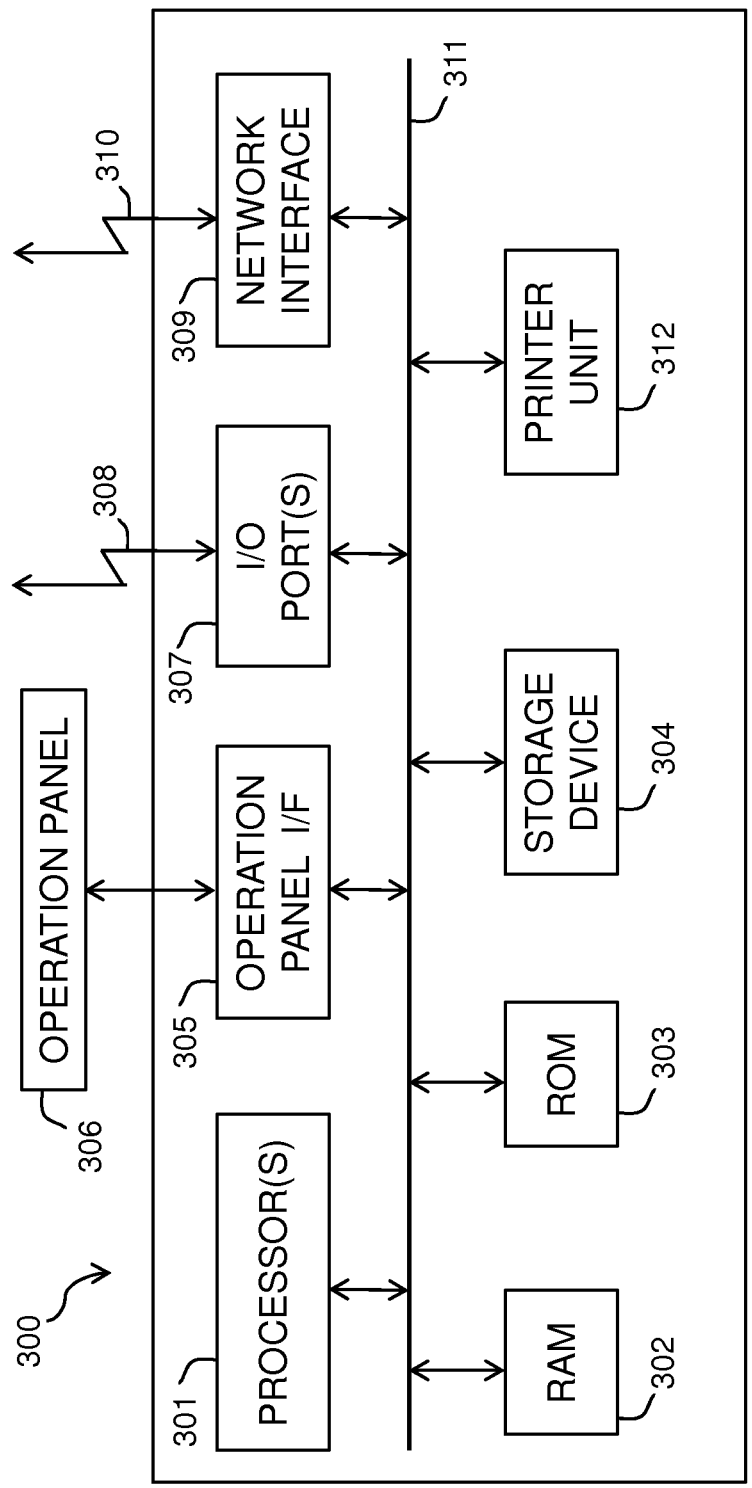
FIG. 3 illustrates an example image processing device.

FIG. 3 illustrates an example image processing device 300. In some embodiments, the image processing device 300 includes the computing system 101 of FIG. 1. For example, in some embodiments, the computing system 101 is embedded in the image processing device 300. In some embodiments, the computing system 101 of FIG. 1 comprises the image processing device 300. The image processing device 300 may be a printer.

In some embodiments, the image processing device 300 performs one or more steps of one or more methods described or illustrated herein. In some embodiments, the image processing device 300 provides functionality described or illustrated herein. In some embodiments, software running on the image processing device 300 performs one or more steps of one or more methods described or illustrated herein or provides functionality described or illustrated herein. Particular embodiments include one or more portions of the image processing device 300.

The image processing device 300 includes one or more processor(s) 301. The processor(s) 301 include a central processing unit (CPU) that performs overall control functions for the image processing device 300. The CPU uses a random access memory (RAM) 302 as a work area while executing instructions. The CPU executes instructions of various programs stored in one or more memory devices. For example, the CPU executes programs stored in a read only memory (ROM) 303 and in a storage device 304.

In some embodiments, the processor(s) 301 include one or more processors in addition to the CPU. By way of example, the processor(s) 301 may include one or more general-purpose microprocessor(s), application-specific microprocessor(s), and/or special purpose microprocessor(s). Additionally, in some embodiments the processor(s) 301 may include one or more internal caches for data or instructions.

The processor(s) 301 provide the processing capability required to execute an operating system, application programs, and various other functions provided on the image processing device 300. The processor(s) 301 perform or cause components of the image processing device 300 to perform various operations and processes described herein, in accordance with instructions stored in one or more memory devices.

The RAM 302 is used as a work area when the processor(s) 301 execute various instructions, such as those making up computer programs stored in the ROM 303 and/or the storage device 304. The RAM 302 may be used as a temporary storage area for various data, including input image data. The RAM 302 may be used as a cache memory. In some embodiments, the RAM may be dynamic RAM (DRAM) or static RAM (SRAM).

The ROM 303 stores data and programs having computer-executable instructions for execution by the processor(s) 301. In some embodiments, the ROM 303 is a boot ROM, storing instructions for the booting process. In some embodiments, the ROM 303 may be flash memory.

The storage device 304 stores application data, program modules and other information. One or more program modules stored in the storage device 304 are configured to cause various operations and processes described herein to be executed. In some embodiments, the application 104 resides on the storage device 304 and executes on the image processing device 300.

The storage device 304 also stores other programs and data to be processed. For example, the storage device 304 stores an operating system including programs and data for managing hardware and software components of the image processing device 300. Applications on the image processing device 300 may utilize the operating system to perform various operations. The storage device 304 may further store other programs and/or drivers that enable various functions of the image processing device 300, graphical user interface (GUI) functions, and/or processor functions. The storage device 304 may also store data files including, for example, image data, user data, configuration information, GUI components, such as graphical elements or templates, or other data required by the image processing device 300.

In some embodiments, the image processing device 300 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 300. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 305 provides output signals to and receives input signals from an operation panel 306. Regarding the output signals, the operation panel interface 305 provides GUI data to the operation panel 306 for display on a liquid crystal display (LCD). Regarding the input signals, the operation panel interface 305 receives input signals based on user input operations at the operation panel 306 and relays the input signals to the processor(s) 301. In some embodiments, the operation panel 306 includes a touch sensitive element operable to receive user input operations or commands based on the touching of graphical objects displayed on the LCD. In some embodiments, the operation panel 306 includes a hard key panel.

The image processing device 300 includes one or more input/output (I/O) port(s) 307. The I/O port(s) 307 may include any suitable interface type such as a universal serial bus (USB) port, FireWire port (IEEE-1394), serial port, parallel port, or AC/DC power connection port. The I/O port(s) 307 enable one or more external device(s) 308 to communicate with the image processing device 300 when the external device(s) 308 is/are connected to the I/O port(s) 307. Examples of external devices 308 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 309 includes hardware, software, or both providing one or more interfaces for communication (such as, for example, packet-based communication) between the image processing device 300 and one or more other computing systems or one or more networks 310. As an example and not by way of limitation, the network interface 309 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 110 and any suitable network interface 309 for it. As an example and not by way of limitation, the image processing device 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 110 may be wired or wireless. As an example, the image processing device 300 may communicate with a wireless PAN (WPAN) (such as, for example, a BLUETOOTH WPAN), a WI-FI network, a WI-MAX network, or other suitable wireless network or a combination of two or more of these. The image processing device 300 may include any suitable network interface 309 for any of these networks 310, where appropriate.

A system bus 311 interconnects various components of the image processing device 300 thereby enabling the transmission of data and execution of various processes. The system bus 311 may include one or more types of bus structures including a memory bus or memory controller, a peripheral bus, and a local bus using any of a variety of bus architectures.

The printer unit 312 is an image output device for printing on a sheet an image corresponding to image data. In response to a print command received at the image processing device 300, the printer unit 312 receives image data and outputs to a sheet an image corresponding to the image data.

Figure 4:
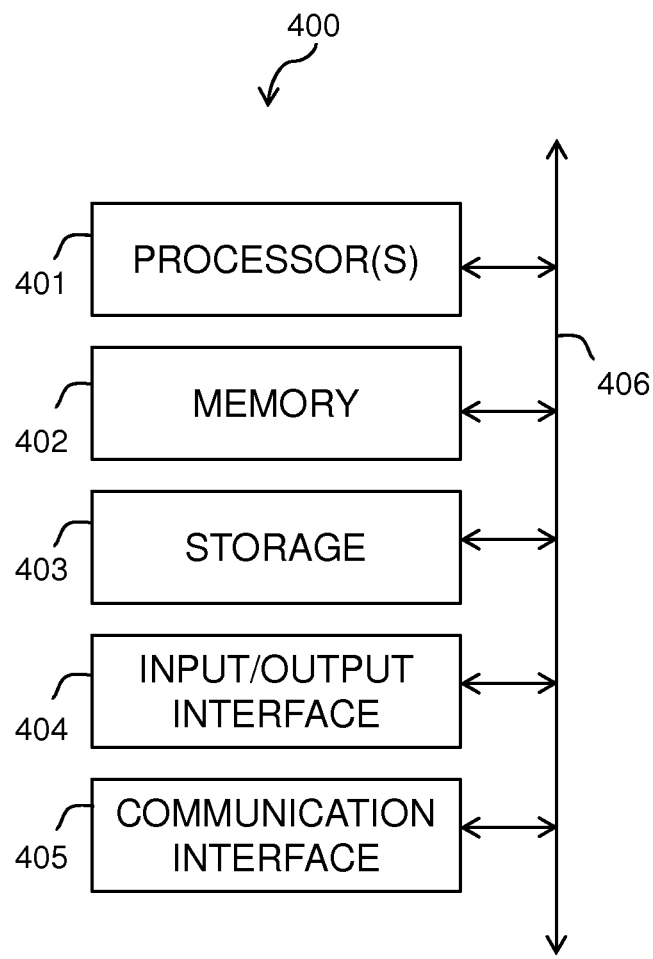
FIG. 4 illustrates an example computing system.

FIG. 4 illustrates an example computing system 400. According to various embodiments, all or a portion of the description of the computing system 400 is applicable to all or a portion of one or more of the computing system 101, the computing system 102, and the computing system 103.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

In some embodiments, the computing system 400 performs one or more steps of one or more methods described or illustrated herein. In some embodiments, the computing system 400 provides functionality described or illustrated herein. In some embodiments, software running on the computing system 400 performs one or more steps of one or more methods described or illustrated herein or provides functionality described or illustrated herein. Some embodiments include one or more portions of the computing system 400.

The computing system 400 includes one or more processor(s) 401, memory 402, storage 403, an input/output (I/O) interface 404, a communication interface 405, and a bus 406. The computing system 400 may take any suitable physical form. For example, and not by way of limitation, the computing system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

The processor(s) 401 include hardware for executing instructions, such as those making up a computer program. The processor(s) 401 may retrieve the instructions from the memory 402, the storage 403, an internal register, or an internal cache. The processor(s) 401 then decode and execute the instructions. Then, the processor(s) 401 write one or more results to the memory 402, the storage 403, the internal register, or the internal cache. The processor(s) 401 may provide the processing capability to execute the operating system, programs, user and application interfaces, and any other functions of the computing system 400.

The processor(s) 401 may include a central processing unit (CPU), one or more general-purpose microprocessor(s), application-specific microprocessor(s), and/or special purpose microprocessor(s), or some combination of such processing components. The processor(s) 401 may include one or more graphics processors, video processors, audio processors and/or related chip sets.

In some embodiments, the memory 402 includes main memory for storing instructions for the processor(s) 401 to execute or data for the processor(s) 401 to operate on. By way of example, the computing system 400 may load instructions from the storage 403 or another source to the memory 402. During or after execution of the instructions, the processor(s) 401 may write one or more results (which may be intermediate or final results) to the memory 402. One or more memory buses (which may each include an address bus and a data bus) may couple the processor(s) 401 to the memory 402. One or more memory management units (MMUs) may reside between the processor(s) 401 and the memory 402 and facilitate accesses to the memory 402 requested by the processor(s) 401. The memory 402 may include one or more memories. The memory 402 may be random access memory (RAM).

The storage 403 stores data and/or instructions. As an example and not by way of limitation, the storage 403 may include a hard disk drive, a floppy disk drive, flash memory, an optical disc, a magneto-optical disc, magnetic tape, or a Universal Serial Bus (USB) drive or a combination of two or more of these. In some embodiments, the storage 403 is a removable medium. In some embodiments, the storage 403 is a fixed medium. In some embodiments, the storage 403 is internal to the computing system 400. In some embodiments, the storage 403 is external to the computing system 400. In some embodiments, the storage 403 is non-volatile, solid-state memory. In some embodiments, the storage 403 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 403 may include one or more memory devices. One or more program modules stored in the storage 403 may be configured to cause various operations and processes described herein to be executed.

The I/O interface 404 includes hardware, software, or both providing one or more interfaces for communication between the computing system 400 and one or more I/O devices. The computing system 400 may include one or more of these I/O devices, where appropriate. One or more of these I/O devices may enable communication between a person and the computing system 400. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 404 includes one or more device or software drivers enabling the processor(s) 401 to drive one or more of these I/O devices. The I/O interface 404 may include one or more I/O interfaces.

The communication interface 405 includes hardware, software, or both providing one or more interfaces for communication (such as, for example, packet-based communication) between the computing system 400 and one or more other computing systems or one or more networks. As an example and not by way of limitation, the communication interface 405 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 405 for it. As an example and not by way of limitation, the computing system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 400 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The computing system 400 may include any suitable communication interface 405 for any of these networks, where appropriate. The communication interface 405 may include one or more communication interfaces 405.

The bus 406 interconnects various components of the computing system 400 thereby enabling the transmission of data and execution of various processes. The bus 406 may include one or more types of bus structures including a memory bus or memory controller, a peripheral bus, and a local bus using any of a variety of bus architectures.

Various above-described operations performed by the computing system 101, the computing system 102, and the server computing system 103 may be executed and/or controlled by one or more applications running on the computing system 101, the computing system 102, and the server computing system 103, respectively. The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a computer-readable storage medium storing instructions which, when executed by one or more processors, cause the one or more processors to perform one or more embodiments of the invention described herein. The scope of the present invention includes a computer-readable storage medium storing instructions which, when executed by one or more processors, cause the one or more processors to perform one or more embodiments of the invention described herein.

Examples of a computer-readable storage medium include a floppy disk, a hard disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

What is claimed is:

1. A method comprising:
   receiving, at an image processing device from a browser on a computing device, a credential;
   determining whether the credential is valid;
   in response to determining that the credential is valid, generating a string of numeric characters at the image processing device;
   associating the string of numeric characters with the credential by storing the string of numeric characters and the credential in a memory of the image processing device such that the string of numeric characters and the credential are associated with each other;
   sending, from the image processing device to the computing device, the string of numeric characters to be displayed by the browser on the computing device;
   receiving, at the image processing device, an identifier that identifies a security token, the security token comprising a machine-readable storage medium that stores the identifier, wherein the receiving the identifier that identifies the security token comprises receiving the identifier via an input device, the identifier having been read from the security token by the input device;
   determining whether the identifier matches an entry in a data store that includes one or more user accounts, the one or more user accounts including a user account associated with the credential;
   in response to determining that the identifier does not match an entry in the data store, presenting a message on a display of the image processing device prompting a user to provide a string of characters via a user interface of the image processing device;
   receiving, at the image processing device, the string of characters via the user interface based on one or more user inputs to the user interface;
   determining whether the string of characters received via the user interface matches the string of numeric characters stored in the memory of the image processing device by comparing, at the image processing device, the string of characters received via the user interface to the string of numeric characters stored in the memory;
   in response to determining that the string of characters received via the user interface matches the string of numeric characters stored in the memory, performing a registration process for adding the identifier to the data store such that the user account associated with the credential includes the identifier; and
   deleting the string of numeric characters and the credential from the memory after the performing the registration process.

2. The method of claim 1, wherein the determining whether the credential is valid comprises using a remote authentication service to determine whether the credential is valid.

3. The method of claim 1, wherein the user interface includes one or more controls for scrolling between characters and selecting characters, and
   wherein the string of characters received via the user interface comprises a string of characters generated based at least in part on user interactions with the one or more controls.

4. The method of claim 1, wherein the data store comprises a remote data store,
   wherein the determining whether the identifier matches an entry in the data store comprises using a directory service to determine whether the identifier matches an entry in the data store, and
   wherein the performing the registration process comprises using the directory service to add the identifier as an entry in the data store such that the identifier is associated with the user account associated with the credential.

5. The method of claim 1, further comprising:
   in response to determining that the string of characters received via the user interface does not match the string of numeric characters stored in the memory, presenting a message on the display prompting the user to provide another string of characters via the user interface of the image processing device;

receiving, at the image processing device, the another string of characters via the user interface;

determining whether the another string of characters received via the user interface matches the string of numeric characters stored in the memory; and in response to determining that the another string of characters received via the user interface does not match the string of numeric characters stored in the memory, deleting the string of numeric characters and the credential from the memory.

6. The method of claim 1, further comprising:

receiving, at the image processing device from a browser on a second computing device, a second credential;

determining whether the second credential is valid;

in response to determining that the second credential is valid, generating a second string of numeric characters at the image processing device;

associating the second string of numeric characters with the second credential by storing the second string of numeric characters and the second credential in the memory such that the second string of numeric characters and the second credential are associated with each other;

sending, from the image processing device to the second computing device, the second string of numeric characters;

in response to an event associated with the second string of numeric characters, initiating a timer that expires after a predetermined time period;

monitoring for an expiration of the timer; and based on the expiration of the timer, deleting the second string of numeric characters and the second credential from the memory.

7. A non-transitory computer-readable medium storing instructions that, when executed by one or more processors, cause the one or more processors to perform operations comprising:

receiving, at an image processing device from a browser on a computing device, a credential;

determining whether the credential is valid;

in response to determining that the credential is valid, generating a string of numeric characters at the image processing device;

associating the string of numeric characters with the credential by storing the string of numeric characters and the credential in a memory of the image processing device such that the string of numeric characters and the credential are associated with each other;

sending, from the image processing device to the computing device, the string of numeric characters to be displayed by the browser on the computing device;

receiving, at the image processing device, an identifier that identifies a security token, the security token comprising a machine-readable storage medium that stores the identifier, wherein the receiving the identifier that identifies the security token comprises receiving the identifier via an input device, the identifier having been read from the security token by the input device;

determining whether the identifier matches an entry in a data store that includes one or more user accounts, the one or more user accounts including a user account associated with the credential;

in response to determining that the identifier does not match an entry in the data store, presenting a message on a display of the image processing device prompting a user to provide a string of characters via a user interface of the image processing device;

receiving, at the image processing device, the string of characters via the user interface based on one or more user inputs to the user interface;

determining whether the string of characters received via the user interface matches the string of numeric characters stored in the memory of the image processing device by comparing, at the image processing device, the string of characters received via the user interface to the string of numeric characters stored in the memory;

in response to determining that the string of characters received via the user interface matches the string of numeric characters stored in the memory, performing a registration process for adding the identifier to the data store such that the user account associated with the credential includes the identifier; and deleting the string of numeric characters and the credential from the memory after the performing the registration process.

8. A system comprising:

one or more processors; and one or more computer-readable media coupled to the one or more processors, the one or more computer-readable media storing instructions that, when executed by the one or more processors, cause the one or more processors to perform operations comprising:

receiving, at an image processing device from a browser on a computing device, a credential;

determining whether the credential is valid;

in response to determining that the credential is valid, generating a string of numeric characters at the image processing device;

associating the string of numeric characters with the credential by storing the string of numeric characters and the credential in a memory of the image processing device such that the string of numeric characters and the credential are associated with each other;

sending, from the image processing device to the computing device, the string of numeric characters to be displayed by the browser on the computing device;

receiving, at the image processing device, an identifier that identifies a security token, the security token comprising a machine-readable storage medium that stores the identifier, wherein the receiving the identifier that identifies the security token comprises receiving the identifier via an input device, the identifier having been read from the security token by the input device;

determining whether the identifier matches an entry in a data store that includes one or more user accounts, the one or more user accounts including a user account associated with the credential;

in response to determining that the identifier does not match an entry in the data store, presenting a message on a display of the image processing device prompting a user to provide a string of characters via a user interface of the image processing device;

receiving, at the image processing device, the string of characters via the user interface based on one or more user inputs to the user interface;

determining whether the string of characters received via the user interface matches the string of numeric characters stored in the memory of the image processing device by comparing, at the image processing device, the string of characters received via the user interface to the string of numeric characters stored in the memory;

in response to determining that the string of characters received via the user interface matches the string of numeric characters stored in the memory, performing a registration process for adding the identifier to the data store such that the user account associated with the credential includes the identifier; and deleting the string of numeric characters and the credential from the memory after the performing the registration process.

9. The system of claim 8, wherein the determining whether the credential is valid comprises using a remote authentication service to determine whether the credential is valid.

10. The system of claim 8, wherein the user interface includes one or more controls for scrolling between characters and selecting characters, and wherein the string of characters received via the user interface comprises a string of characters generated based at least in part on user interactions with the one or more controls.

11. The system of claim 8, wherein the data store comprises a remote data store, wherein the determining whether the identifier matches an entry in the data store comprises using a directory service to determine whether the identifier matches an entry in the data store, and wherein the performing the registration process comprises using the directory service to add the identifier as an entry in the data store such that the identifier is associated with the user account associated with the credential.

12. The system of claim 8, the operations further comprising:

in response to determining that the string of characters received via the user interface does not match the string of numeric characters stored in the memory, presenting a message on the display prompting the user to provide another string of characters via the user interface of the image processing device;

receiving, at the image processing device, the another string of characters via the user interface;

determining whether the another string of characters received via the user interface matches the string of numeric characters stored in the memory; and in response to determining that the another string of characters received via the user interface does not match the string of numeric characters stored in the memory, deleting the string of numeric characters and the credential from the memory.

13. The system of claim 8, the operations further comprising:

receiving, at the image processing device from a browser on a second computing device, a second credential;

determining whether the second credential is valid;

in response to determining that the second credential is valid, generating a second string of numeric characters at the image processing device;

associating the second string of numeric characters with the second credential by storing the second string of numeric characters and the second credential in the memory such that the second string of numeric characters and the second credential are associated with each other;

sending, from the image processing device to the second computing device, the second string of numeric characters;

in response to an event associated with the second string of numeric characters, initiating a timer that expires after a predetermined time period;

monitoring for an expiration of the timer; and based on the expiration of the timer, deleting the second string of numeric characters and the second credential from the memory.

14. The system of claim 8, wherein the image processing device is a printer.

15. The system of claim 8, wherein the identifier is information that identifies a smart card.

16. The system of claim 8, wherein the identifier is information that identifies a mobile device.

17. The method of claim 1, wherein the image processing device is a printer.

18. The method of claim 1, wherein the identifier is information that identifies a smart card.

19. The method of claim 1, wherein the identifier is information that identifies a mobile device.

* * * * *